United States Patent
Liao

(10) Patent No.: US 9,130,507 B1
(45) Date of Patent: Sep. 8, 2015

(54) GAIN SMOOTHING FOR BURST DEMODULATION IN SERVO CHANNEL

(71) Applicant: LSI Corporation, San Jose, CA (US)

(72) Inventor: Yu Liao, Longmont, CO (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 14/104,458

(22) Filed: Dec. 12, 2013

Related U.S. Application Data

(60) Provisional application No. 61/906,114, filed on Nov. 19, 2013.

(51) Int. Cl.
*G11B 20/10* (2006.01)
*H03D 7/14* (2006.01)

(52) U.S. Cl.
CPC .................................... *H03D 7/14* (2013.01)

(58) Field of Classification Search
None
See application file for complete search history.

(56) References Cited

U.S. PATENT DOCUMENTS

| | | | |
|---|---|---|---|
| 7,813,065 B2 | 10/2010 | Annampedu et al. | |
| 8,049,982 B1 | 11/2011 | Grundvig et al. | |
| 8,199,422 B2 | 6/2012 | Annampedu et al. | |
| 2006/0023328 A1* | 2/2006 | Annampedu | 360/46 |
| 2012/0182643 A1* | 7/2012 | Zhang et al. | 360/77.02 |
| 2013/0124949 A1* | 5/2013 | Zhang | 714/807 |
| 2013/0148233 A1* | 6/2013 | Xia et al. | 360/65 |
| 2014/0104717 A1* | 4/2014 | Zhang et al. | 360/46 |

* cited by examiner

*Primary Examiner* — Paul Huber
(74) *Attorney, Agent, or Firm* — Suiter Swantz pc llo

(57) ABSTRACT

A digital gain estimation loop and a gain smoothing method for burst demodulation in a servo channel are disclosed. The gain estimation is performed on digital samples obtained from a digital finite impulse response (DFIR) filter, wherein the digital samples include at least a portion of a servo address mark (SAM) and gray data in the servo sector. The gain estimation method includes the steps of: generating a reference signal based on the digital samples obtained from the DFIR filter; generating a comparison signal by delaying the digital samples obtained from the DFIR filter; determining a gain error gradient by comparing the reference signal and the comparison signal; and calculating the second gain adjustment based on the gain error gradient.

20 Claims, 2 Drawing Sheets

GAIN SMOOTHING FOR BURST DEMODULATION IN SERVO CHANNEL

CROSS-REFERENCE TO RELATED APPLICATIONS

The present application claims the benefit under 35 U.S.C. §119(e) of U.S. Provisional Application Ser. No. 61/906,114, filed Nov. 19, 2013. Said U.S. Provisional Application Ser. No. 61/906,114 is hereby incorporated by reference in its entirety.

TECHNICAL FIELD

The present invention relates to the field of data communication and data storage, and particularly to burst demodulation for servo control in magnetic recording.

BACKGROUND

A read channel integrated circuit (IC) is one of the core electronic components in a modern magnetic recording system, such as a hard disk drive. A read channel converts and encodes data to enable the heads to write data to the disk drive and then read back the data accurately. The disks in a drive typically have many tracks on them. Each track typically consists of mostly user or "read" data sectors, as well as control or "servo" data sectors embedded between the read sectors. The servo sectors help to position the magnetic recording head on a track so that the information stored in the read sectors is retrieved properly.

SUMMARY

Accordingly, an embodiment of the present disclosure is directed to a gain smoothing method for burst demodulation in a servo channel. The method determines two gain adjustment values separately, wherein the first gain adjustment is determined using a first gain estimation algorithm and at least a portion of a preamble in a servo sector, and the second gain adjustment is determined using a second gain estimation algorithm and at least a portion of the preamble, a servo address mark (SAM) and gray data in the servo sector. Both the first gain adjustment and the second gain adjustment are provided to a burst demodulator for gain variations compensation in burst demodulation.

A further embodiment of the present disclosure is also directed to a gain smoothing method for burst demodulation in a servo channel that determines two gain adjustment values separately. More specifically, the second gain estimation algorithm is performed on digital samples obtained from a digital finite impulse response (DFIR) filter, wherein the digital samples include at least a portion of the preamble, a servo address mark (SAM) and gray data in the servo sector. The second gain estimation algorithm includes the steps of: generating a reference signal based on the digital samples obtained from the DFIR filter; generating a comparison signal by delaying the digital samples obtained from the DFIR filter; determining a gain error gradient by comparing the reference signal and the comparison signal; and calculating the second gain adjustment based on the gain error gradient.

An additional embodiment of the present disclosure is directed to a digital gain estimation loop for burst demodulation in a servo channel. The digital gain estimation loop includes a reference signal generator in communication with a digital finite impulse response (DFIR) filter in the servo channel. The reference signal generator receives digital samples from the DFIR filter and generates a reference signal based on the digital samples received from the DFIR filter, wherein the digital samples include at least a portion of the preamble, a servo address mark (SAM) and gray data in a servo sector. The digital gain estimation loop also includes a time-delay circuit in communication with the DFIR filter. The time-delay circuit receives the same digital samples from the DFIR filter and generates a comparison signal by applying at least one predetermined delay to the digital samples. The digital gain estimation loop further includes a gain error gradient module in communication with the reference signal generator and the time-delay circuit. The gain error gradient module determines a gain error gradient by comparing the reference signal and the comparison signal. The digital gain estimation loop utilizes a gain adjustment module to calculate a gain adjustment based on the gain error gradient determined.

It is to be understood that both the foregoing general description and the following detailed description are exemplary and explanatory only and are not necessarily restrictive of the invention as claimed. The accompanying drawings, which are incorporated in and constitute a part of the specification, illustrate embodiments of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION

Reference will now be made in detail to the presently preferred embodiments of the invention, examples of which are illustrated in the accompanying drawings.

Figure 1:
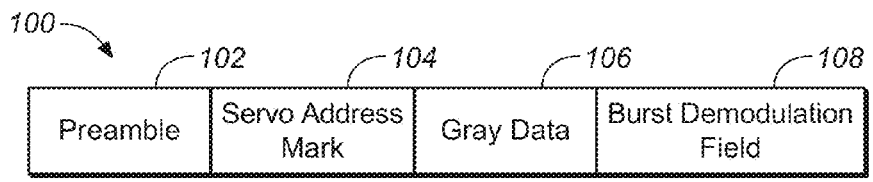
FIG. 1 is an illustration depicting a servo data format of a servo sector.

Referring to FIG. 1, an illustration depicting a servo data format 100 of a servo sector is shown. A typical servo sector includes a servo preamble pattern 102 which allows the system to recover the timing and gain of the written servo data. The preamble is typically followed by a servo address mark (SAM) 104 which is the same for all servo sectors. The SAM is followed by servo gray data 106, which is then followed by one or more burst demodulation fields 108. SAM 104 typically includes some fixed number of bits. Gray data 106 represents the track number/cylinder information and serves as a coarse positioning for the magnetic head of the recording system. Burst demodulation field 108 provides fine positioning information for the read head traversing a magnetic storage medium.

Conventional systems typically estimate the gain using techniques such as Zero Gain Start (ZGS) on the preamble and set the variable gain amplifier (VGA) gain value based on the gain value obtained from the ZGS estimation for each servo event. However, due to servo format limitations, preambles are short and can cause variations in ZGS estimation, which in turn cause VGA gain variations. In addition, latency exists between VGA and burst demodulation, making the VGA gain variations difficult to compensate for in burst demodulation. Furthermore, VGA gain variations also cause peak value variations in burst demodulation. It is noted that since the quality of burst demodulation in a servo channel is quantified as the ratio between the mean of the burst demodulation peaks and the standard deviation of the peaks, variations in peak values in burst demodulation leads to quality degradation of burst demodulation.

In accordance with embodiments of the present disclosure, a method to compensate for VGA gain variations in a servo channel is utilized to improve the quality of burst demodulation. The methods and systems in accordance with embodiments of the present disclosure adaptively compensate the VGA gain errors based on the preamble as well as SAM and gray filed information. This allows a large VGA gain offset to be compensated in a timely manner.

Figure 2:
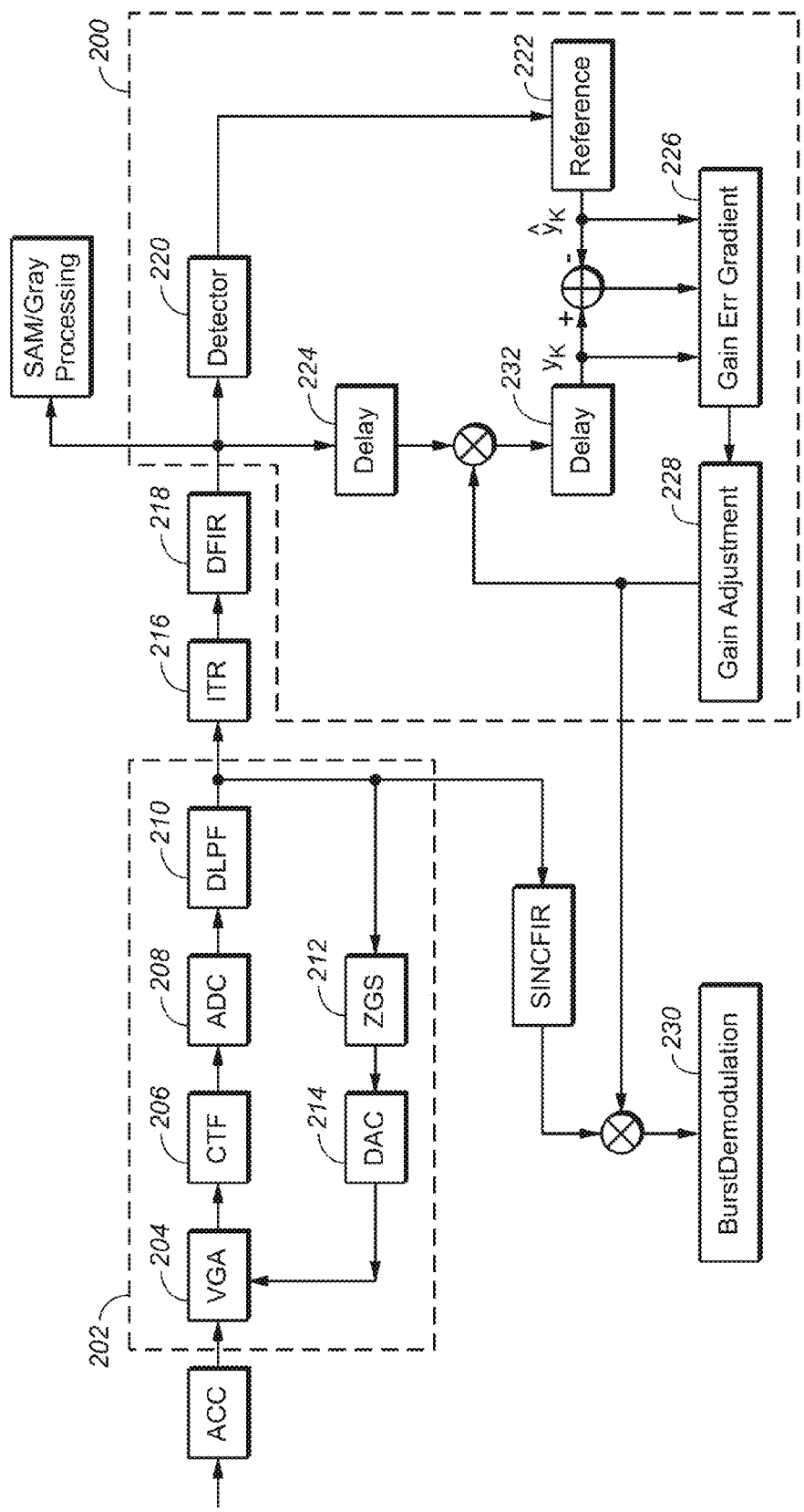
FIG. 2 is a block diagram depicting a burst demodulation system utilizing a digital gain smoothing loop.

Referring to FIG. 2, a block diagram depicting a burst demodulation system utilizing a digital gain smoothing (may also be referred to as gain variation compensation) loop 200 is shown. More specifically, in the embodiment depicted in FIG. 2, two gain estimation loops 200 and 202 are utilized for gain smoothing purposes and the two loops 200 and 202 are configured to operate separately with respect to each other. Loop 202 estimates the gain using conventional techniques such as ZGS or the like. For example, as shown in the figure, an input signal is received via an analog coupling (AC coupling) and is provided to a variable gain amplifier (VGA) 204. The output of the VGA 204 goes through a continuous time filter (CTF) 206, which is then converted to a digital signal via the analog-to-digital converter (ADC) 208. The digital signal is then filtered (e.g., using a digital low pass filter, or DLPF) 210 and provided to ZGS block 212 as input. The output of the ZGS block is then converted to an analog signal via the digital-to-analog converter (DAC) 214 and used to adjust the VGA gain value.

The gain estimation loop 200, on the other hand, is implemented completely in digital domain and no feedback is provided to the analog VGA 204. In accordance with embodiments of the present disclosure, the digital gain estimation loop 200 generates a reference signal which represents the ideal data without noises, and compares this reference signal to a time-delayed signal in order to determine a gain error gradient. The gain error gradient is then utilized to calculate a gain adjustment, which is provided to the burst demodulator for gain compensation.

More specifically, in the embodiment depicted in FIG. 2, the digital gain estimation loop 200 processes the digital signal after it had already passed through the digital filter 210, which can be a digital low pass filter (DLPF) or a digital band pass filter for anti-aliasing and/or noise reduction. It is contemplated that the filtered digital signal goes through an interpolated timing recovery (ITR) block 216 which includes a bank of phase interpolators and an open loop phase tracking performed at the outputs of interpolators. The digital signal at the output of block 216 is phase locked and further processed by the digital finite impulse response (DFIR) block 218 that is commonly used in servo systems to equalize the DFIR input signal to a target response (equalization target response) to reduce Inter-Symbol-Interference (ISI) and noise for easier SAM and gray code processing/detection. In this manner, the digital gain estimation loop 200 is able to process digital samples that include at least a portion of SAM and gray data in the servo sector to improve gain estimation accuracy.

In one embodiment, the digital gain estimation loop 200 utilizes a detector 220 that takes the output of DFIR 218 as input to generate the estimation of preamble, SAM and gray bits. The detector 220 can be as simple as a peak detector or more sophisticated detector such as a ML (Maximum Likelihood) sequence detector. The detected information, estimation of preamble, SAM and gray bits, is then provided to a reference signal generator 222, which convolves the decisions received from the detector 220 with the equalization target response of the DFIR 218. In this embodiment, the reference signal $\hat{y}_k$ at time k is calculated as:

$$\hat{y}_k = \sum_{i=0}^{L-1} t_i \cdot a_{k-i}$$

Wherein $[t_0, t_1, \ldots, t_{L-1}]$ is the equalization target response and $a_{k-i}$ is the decision from detector 220.

In an alternative embodiment, the reference signal generator 222 is configured to compute the average of the digital samples received (e.g., output of the DFIR) to obtain cleaner equalized samples. It is understood that the purpose of the reference signal generator 222 is to generate a reference signal that represents the ideal (or true) data without (or with reduced) noises. It is contemplated that various other methods may be utilized to generate the reference signal without departing from the spirit and scope of the present disclosure.

As mentioned above, the digital gain estimation loop 200 compares the reference signal generated by the reference signal generator 222 to a time-delayed comparison signal in order to determine a gain error gradient. The reason this comparison signal needs to be time-delayed is to compensate for the processing time of the digital gain estimation loop 200. More specifically, a first delay 224 is utilized to compensate for the time it takes to generate the reference signal. For example, if the reference signal is generated based on the detected information received from the detector 220, the first delay 224 should compensate for the amount of time the detector 220 takes to perform the detection and the amount of time the reference signal generator 222 takes to generate reference signal. In another example, if the reference signal is generated by computing the average of the DFIR output, the first delay 224 should compensate for that computation time. It is contemplated that the amount of time it takes to generate the reference signal can be determined for a chosen implementation, thus the delay value of the first delay 224 can be configured accordingly.

The comparison between the reference signal and the time-delayed comparison signal allows the digital gain estimation loop 200 to determine the gain error gradient. In one embodiment, the gain error gradient module 226 determines the gain error gradient using least mean square (LMS), zero forcing (ZF) or other adaptive algorithms. For illustrative purposes, let $y_k$ be the adjusted DFIR output and $\hat{y}_k$ be the corresponding reference signal generated by the reference signal generator, a LMS gain error gradient can be calculated as $e_k = y_k \cdot (y_k \hat{y}_k)$. Using the same notation, a ZF gain error gradient can be calculated as $e_k = \hat{y}_k \cdot (y_k - \hat{y}_k)$. It is understood that the equations presented above are for illustrative purposes. Variations of the LMS and ZF algorithms may be utilized to calculate the gain error gradient $e_k$ without departing from the spirit and scope of the present disclosure, as long as the result represents the right direction the gain should be adjusted.

The gain error gradient, once determined, is provide to the gain adjustment module 228, which is configured to calculate the gain adjustment based on the gain error gradient. The gain adjustment can be calculated based on either a linear or a nonlinear function of the gain error gradient. For example, a linear gain adjustment can be calculated as $g_k = g_{k-1} - \mu \cdot e_k$, where $e_k$ is the gain error gradient and u is a programmable weight value for the gain error gradient which determines the speed of the adaptation. In another example, if a nonlinear relationship is defined between the gain adjustment and the gain error gradient, the nonlinear gain adjustment can be calculated as $g_k = f(g\_reg_k)$, where $f(x)$ is a nonlinear (e.g., exponential) function and $g\_reg_k = g\_reg_{k-1} - \mu \cdot e_k$.

Once the gain adjustment is calculated, the adjustment value can be provided to the burst demodulator 230 for gain compensation in burst demodulation. In the embodiment depicted in FIG. 2, gain adjustment values from both loops 202 and 200 are utilized, providing gain smoothing for burst demodulation based on preambles as well as SAM and gray filed information. In addition, the gain adjustment value calculated by the gain adjustment module 228 is also utilized to adjust the gain on the time-delayed comparison signal in loop 200, forming a feedback loop to improve the accuracy of the gain estimation.

Furthermore, it is noted that the digital gain estimation loop 200 applies a second delay 232 to the comparison signal. This second delay 232 is utilized to compensate for the amount of time the grain error gradient module 226 takes to calculate the error gradient and the amount of time the gain adjustment module 228 takes to calculate the gain adjustment. It is understood that the purpose of using the two time delays 224 and 232 as well as adjusting the gain based on the calculated adjustment value is to make the comparison between the reference signal and the time-delayed signal as accurate as possible, which in turn improves the accuracy of the adjustment value calculated by this digital gain estimation loop 200.

Figure 3:
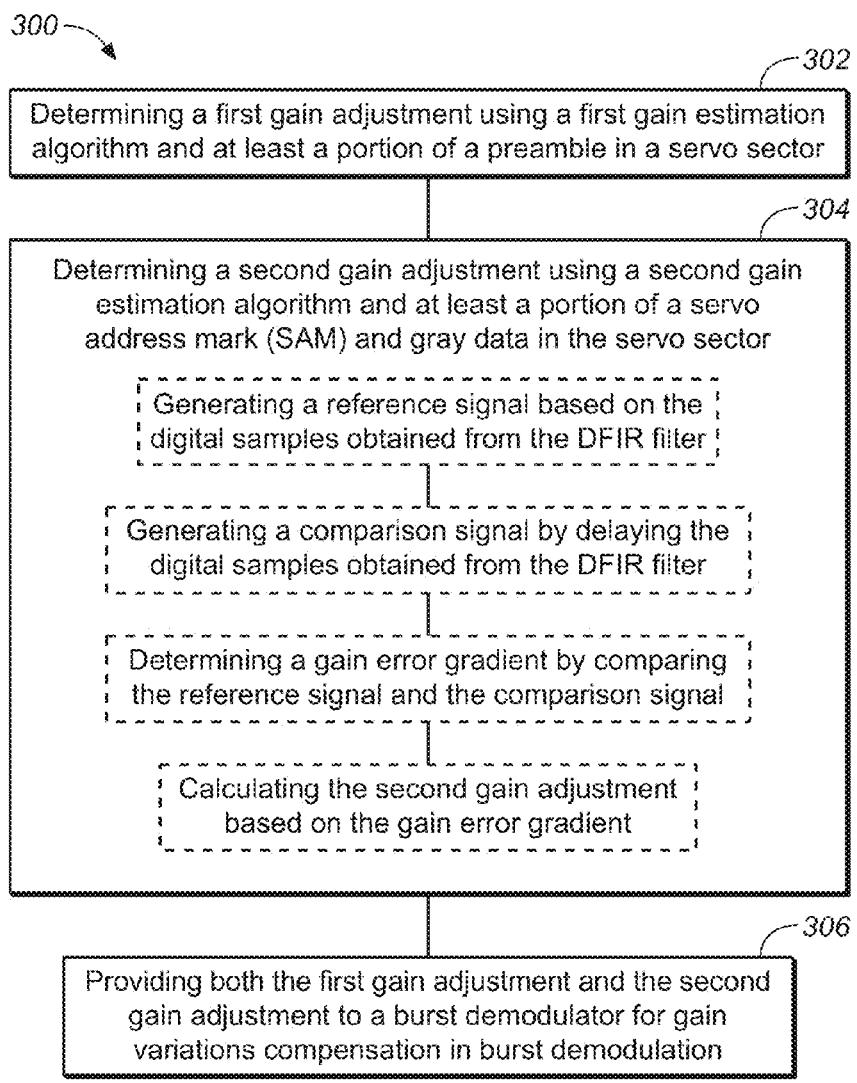
FIG. 3 is a flow diagram illustrating a gain smoothing method 300 for burst demodulation in a servo channel.

FIG. 3 is a flow diagram illustrating a gain smoothing method 300 for burst demodulation in a servo channel. The gain smoothing method utilizes two separate gain estimation loops to determine two gain adjustment values. One of the gain estimation algorithms is utilized in step 302 and performed on the preamble in the servo sector to determine a first gain adjustment value. Another gain estimation algorithm is utilized in step 304 to determine a second gain adjustment value. As described above, the second gain estimation algorithm is performed completely on digital samples obtained from a digital finite impulse response (DFIR) filter, wherein the digital samples include at least a portion of the preamble, the servo address mark (SAM) and gray data in the servo sector.

More specifically, the gain estimation algorithm performed in step 304 includes the steps of: generating a reference signal based on the digital samples obtained from the DFIR filter; generating a comparison signal by delaying the digital samples obtained from the DFIR filter; determining a gain error gradient by comparing the reference signal and the comparison signal; and calculating the second gain adjustment based on the gain error gradient.

It is noted that both the first gain adjustment and the second gain adjustment are provide to the burst demodulator in step 306 for gain variations compensation in burst demodulation. Providing both the gain adjustments to the burst demodulator allows the gain smoothing to be performed based on preambles as well as SAM and gray filed information with improved accuracy and efficiency. It is contemplated, however, that since the two gain estimation algorithms (loops) operate separately with respect to each other, the second gain estimation algorithm that is performed completely on digital samples can be utilized alone without departing from the spirit and scope of the present disclosure.

It is to be understood that the present disclosure may be conveniently implemented in forms of a software package. Such a software package may be a computer program product which employs a computer-readable storage medium including stored computer code which is used to program a computer to perform the disclosed function and process of the present invention. The computer-readable medium may include, but is not limited to, any type of conventional floppy disk, optical disk, CD-ROM, magnetic disk, hard disk drive, magneto-optical disk, ROM, RAM, EPROM, EEPROM, magnetic or optical card, or any other suitable media for storing electronic instructions.

It is understood that the specific order or hierarchy of steps in the foregoing disclosed methods are examples of exemplary approaches. Based upon design preferences, it is understood that the specific order or hierarchy of steps in the method can be rearranged while remaining within the scope of the present invention. The accompanying method claims present elements of the various steps in a sample order, and are not meant to be limited to the specific order or hierarchy presented.

It is believed that the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely an explanatory embodiment thereof, it is the intention of the following claims to encompass and include such changes.

What is claimed is:

1. A gain smoothing method for burst demodulation in a servo channel, the method comprising:
   determining a first gain adjustment using a first gain estimation algorithm and at least a portion of a preamble in a servo sector;
   determining a second gain adjustment using a second gain estimation algorithm and at least a portion of the preamble, a servo address mark (SAM) and gray data in the servo sector; and
   providing both the first gain adjustment and the second gain adjustment to a burst demodulator for gain variations compensation in burst demodulation.

2. The method of claim 1, wherein the first gain estimation algorithm is based on a Zero Gain Start (ZGS) technique.

3. The method of claim 1, wherein the second gain estimation algorithm is an adaptive algorithm performed completely on digital samples obtained from a digital finite impulse response (DFIR) filter.

4. The method of claim 3, wherein the second gain estimation algorithm includes the steps of:
   generating a reference signal based on the digital samples obtained from the DFIR filter;
   generating a comparison signal by delaying the digital samples obtained from the DFIR filter;
   determining a gain error gradient by comparing the reference signal and the comparison signal; and
   calculating the second gain adjustment based on the gain error gradient.

5. The method of claim 4, wherein the second gain estimation algorithm further includes the steps of:
   adjusting the comparison signal based on the calculated second gain adjustment prior to comparing the reference signal and the comparison signal.

6. The method of claim 4, wherein the gain error gradient is determined utilizing at least one of a least mean square (LMS) or a zero forcing (ZF) algorithm.

7. The method of claim 4, wherein the second gain adjustment is calculated based on a linear function of the gain error gradient.

8. The method of claim 4, wherein the second gain adjustment is calculated based on a nonlinear function of the gain error gradient.

9. A gain smoothing method for burst demodulation in a servo channel, the method comprising:
- determining a first gain adjustment using a first gain estimation algorithm and at least a portion of a preamble in a servo sector;
- determining a second gain adjustment using a second gain estimation algorithm performed on digital samples obtained from a digital finite impulse response (DFIR) filter, the digital samples including at least a portion of the preamble, a servo address mark (SAM) and gray data in the servo sector, wherein the second gain estimation algorithm includes the steps of:
    - generating a reference signal based on the digital samples obtained from the DFIR filter;
    - generating a comparison signal by delaying the digital samples obtained from the DFIR filter;
    - determining a gain error gradient by comparing the reference signal and the comparison signal; and
    - calculating the second gain adjustment based on the gain error gradient; and
- providing both the first gain adjustment and the second gain adjustment to a burst demodulator for gain variations compensation in burst demodulation.

10. The method of claim 9, wherein the first gain estimation algorithm is based on a Zero Gain Start (ZGS) technique.

11. The method of claim 9, wherein the second gain estimation algorithm further includes the steps of:
- adjusting the comparison signal based on the calculated second gain adjustment prior to comparing the reference signal and the comparison signal.

12. The method of claim 9, wherein the gain error gradient is determined utilizing at least one of a least mean square (LMS) or a zero forcing (ZF) algorithm.

13. The method of claim 9, wherein the second gain adjustment is calculated based on a linear function of the gain error gradient.

14. The method of claim 9, wherein the second gain adjustment is calculated based on a nonlinear function of the gain error gradient.

15. A digital gain estimation loop for burst demodulation in a servo channel, the digital gain estimation loop comprising:
- a reference signal generator in communication with a digital finite impulse response (DFIR) filter in the servo channel, the reference signal generator receives digital samples from the DFIR filter and generates a reference signal based on the digital samples received from the DFIR filter, wherein the digital samples include at least a portion of a preamble, a servo address mark (SAM) and gray data in a servo sector;
- a time-delay circuit in communication with the DFIR filter, the time-delay circuit receives the same digital samples from the DFIR filter and generates a comparison signal by applying at least one predetermined delay to the digital samples;
- a gain error gradient module in communication with the reference signal generator and the time-delay circuit, the gain error gradient module determines a gain error gradient by comparing the reference signal and the comparison signal; and
- a gain adjustment module in communication with the gain error gradient module, the gain adjustment module calculates a gain adjustment based on the gain error gradient determined.

16. The digital gain estimation loop of claim 15, wherein the time-delay circuit includes a first delay to compensate for processing time of the reference signal generator and a second delay to compensate for processing time of the gain error gradient module and the gain adjustment module.

17. The digital gain estimation loop of claim 15, wherein the time-delay circuit is further configured to adjust the comparison signal based on the gain adjustment calculated by the gain adjustment module.

18. The digital gain estimation loop of claim 15, wherein the gain error gradient module determines the gain error gradient utilizing at least one of a least mean square (LMS) or a zero forcing (ZF) algorithm.

19. The digital gain estimation loop of claim 15, wherein the gain adjustment module calculates the gain adjustment based on a linear function of the gain error gradient.

20. The digital gain estimation loop of claim 15, wherein the gain adjustment module calculates the gain adjustment based on a nonlinear function of the gain error gradient.

* * * * *